United States Patent [19]

Kajiura et al.

[11] 4,078,253
[45] Mar. 7, 1978

[54] PATTERN GENERATING SYSTEM

[75] Inventors: Toshihiro Kajiura, Osaka; Chiaki Masaki, Settsu; Masahiro Mori, Osaka; Toshibumi Sakata, Tokyo; Haruhisa Shimoda, Yokohama, all of Japan

[73] Assignee: Kanebo Ltd., Tokyo, Japan

[21] Appl. No.: 555,197

[22] Filed: Mar. 4, 1975

[30] Foreign Application Priority Data

Mar. 4, 1974 Japan .................................. 24140/74

[51] Int. Cl.² ............................................ D04B 15/84
[52] U.S. Cl. .............................. 364/900; 66/154 A; 358/78; 364/470; 364/515
[58] Field of Search ...................... 340/172.5, 147, 324; 178/DIG. 2, 6.8, DIG. 1, DIG. 22; 235/151.1, 92 PC, 151.11; 358/75, 80, 78, 903; 364/200, 900; 66/154 A, 50 R

[56] References Cited

U.S. PATENT DOCUMENTS

| 2,654,288 | 10/1953 | Savadelis ......................... 340/324 A |
| 3,578,976 | 5/1971 | Schunack ............................... 358/75 |
| 3,660,597 | 5/1972 | Stock ..................................... 358/80 |
| 3,770,884 | 11/1973 | Curran et al. ...................... 178/5.4 R |
| 3,790,042 | 2/1974 | Collomosse et al. .................. 178/6.8 |
| 3,824,336 | 7/1974 | Gould et al. ........................... 178/6.8 |
| 3,863,260 | 1/1975 | Glaunsinger et al. ................. 358/75 |
| 3,893,166 | 7/1975 | Pugsley ................................. 358/80 |
| 3,924,244 | 12/1975 | Seitz ............................... 340/172.5 |
| 3,975,748 | 8/1976 | Green et al. ........................... 358/78 |

OTHER PUBLICATIONS

Arazi, E., "Electronics in Knitting," Chapter 11 - Response System, American Society of Knitting Technologists, 1972.
Smith, Cameron, Electronics in Knitting, Ch. 7 - "Fycon Instant Pattern Programmer," 1972.
Schlosser, Stanley, "Knitting Industry" - Textile Designing, Marketing & Communication via Color Simulators, 1972.
"Graphicolor Eye System II - by Spacial Data - Automatic Pattern Input System for Electron Knitting Systems.
Ishizawa, "Knitting Technology" - Kanebo's Knit Pattern Information Processing System, vol. 45, No. 6, 2/9/76.

Primary Examiner—Mark E. Nusbaum
Attorney, Agent, or Firm—Frailey and Ratner

[57] ABSTRACT

Pattern information for production of a Jacquard pattern by a knitting or a weaving machine is automatically and quickly obtained. A pattern drawn on a sheet by a designer is converted to an analog type electrical signal by a television camera, and said analog signal is converted to a digital signal according to each color of each picture element. Said digital signal is stored in a digital memory. After the edition of said digital signal in the memory, the digital signal which defines the color of each picture element is applied to a knitting or a weaving machine.

10 Claims, 13 Drawing Figures

Fig. 13

PATTERN GENERATING SYSTEM

BACKGROUND OF THE INVENTION

This invention relates to a system for generating pattern information for a knitting or a weaving machine for producing a Jacquard pattern.

Lately, techniques for automatically producing patterns of knit or woven wares have greatly advanced, as exemplified by a Jacquard knitting machine called "SYSTEMKNIT", which is a computerized machine developed by the Fibrous High Molecular Material Laboratory of the Ministry of International Trade and Industry of Japan. To operate the Jacquard knitting machine, it is necessary to feed pattern information to the machine. The nature of the pattern information varies depending on the type of the knitting machine, i.e., a machine having a mechanical pattern control device or a machine having an electronic pattern control device, so that signals which are adapted for the specific pattern control device are formulated directly or indirectly by suitable processes. Generally speaking, the pattern information is derived from a design developed by an artist, by using a pattern analyzing device.

With a conventional pattern analyzing device, a paper carrying a pattern (design) to be analyzed is wound on a rotary drum, and the paper is optically and electrically scanned while mechanically rotating the drum, for generating sequential electric signals corresponding to the colour (red, green, or blue) of each of the picture elements in the design. The electric signals thus generated are converted into digital signals, for providing information, e.g., in the form of punched tape.

The conventional pattern analyzing device, however, has a shortcoming in that its operation is rather complicated, because rotation of the drum is involved, and because it requires a considerably long time and a large amount of labor to complete the analysis of a pattern due to the need for a long analyzing time.

SUMMARY OF THE INVENTION

The intent of the present invention is to mitigate the above-mentioned shortcomings of the conventional techniques. An object of the present invention is to provide a pattern analyzing system which quickly measures the design of a pattern being analyzed, so as to give accurate pattern information.

To fulfill the aforesaid object, the fundamental characteristics of the present invention are that a patterned objective being analyzed is scanned by a television camera which is widely used in the television industry on commercial basis, so as to convert the design into electric analog signals, and the analog signals are electrically analyzed for determining the color of each picture element, whereby digital pattern information is generated as an output on the basis of the color thus determined. A monochromatic (black and white) television camera is used for the aforesaid scanning, and the color of each picture element is determined based on its picture signal level (corresponding to the luminance of each picture element of the design). It is one of the characteristics of the present invention to analyze the color by using monochromatic picture signals. The color of each picture element thus analyzed is stored in a memory (e.g., an IC memory) in the form of digital signals, and after being suitably processed therein, the stored information is delivered to an output medium.

As a feature of the present invention, an optical color filter can be disposed in front of the television camera, so as to emphasize the difference in colors of the different picture elements of the design, by using the level differences in the picture luminance signals.

Another feature of the pattern analyzing system according to the present invention is to use a monochromatic cathode ray tube and a color cathode ray tube for monitoring the picture signals, as generated by the television camera, and monitoring the pattern stored in the memory, in the course of the pattern analysis.

BRIEF EXPLANATION OF THE DRAWINGS

The foregoing and other objects, features, and attendant advantages of the present invention will be appreciated as the same become better understood by the accompanying drawings wherein.

DETAILED EXPLANATION OF THE PREFERRED EMBODIMENTS

Figure 1:
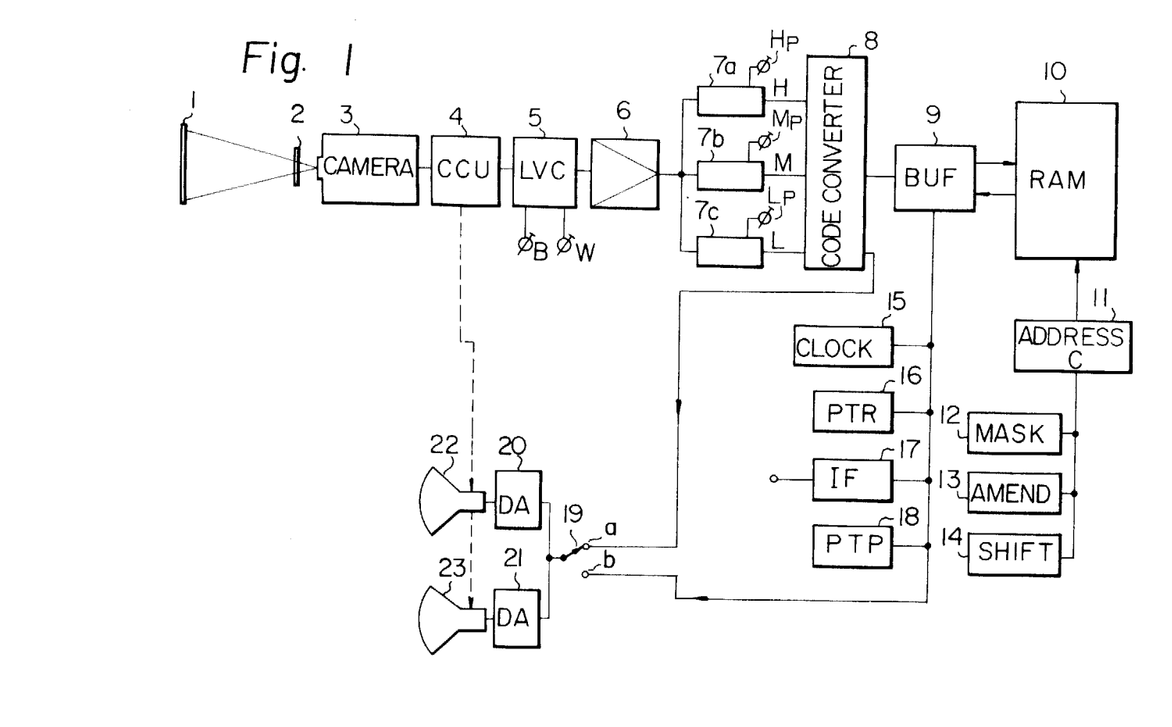
FIG. 1 is a block diagram of a pattern analyzing system according to the present invention.

The invention will now be described in detail, by referring to the accompanying drawings. The invention may be also applicable to a weaving machine without alternating essential parts thereof, but in the explanation, only a case applied to a knitting machine is described for simplicity. FIG. 1 illustrates a simplified block diagram of a pattern analyzing system according to the present invention. An objective 1 with a pattern being analyzed is scanned by a television camera 3. The objective 1 is either a planar design or a three-dimensional design. The television camera 3 includes a lens system and an electric camera tube, such as a vidicon or an image orthicon, and it is a monochromatic television camera. If necessary, a color filter 2 may be disposed in front of the lens system of the television camera 3. The television camera 3 electronically scans the image of the objective being analyzed, and the picture signals produced by the scanning are delivered to its output, together with horizontal synchronizing signals and vertical synchronizing signals. The output signals are applied to the input of three comparators 7a, 7b, and 7c, through a communication control unit 4, a level adjusting unit 5, and an amplifier 6. The communication control unit applies the synchronizing signals to monitor cathode ray tubes 22 and 23. The level adjusting unit 5 adjusts the white and black levels of the picture signals, in response to the actuation of two adjusting knobs W and B.

The comparators 7a, 7b, and 7c have reference levels H, M and L (it is assumed that H > M > L > O), respectively, so that the levels of the input picture signals are compared with the reference levels. Thus, when the input picture signal level is equal to or exceeds the reference level H, the comparator 7a generates its output; when the input picture signal level is equal to the reference level M or larger than the level M but smaller than the level H, the comparator 7b generates its output, and; when the input picture signal level is equal to the reference level L or larger than the level L but smaller than the level M, the comparator 7c generates its output. The values of the reference levels H, M and L can be adjusted by actuating the corresponding knobs, respectively. A code converter 8 acts to convert the comparator output signals into two bit digital signals. For instance, when the comparator 7a has its output, the output from the code converter 8 is "11"; when the comparator 7b has its output, the output from the code converter 8 is "10"; when the comparator 7c has its output, the output from the code converter 8 is "01" and; when none of the three comparators has an output, the output from the code converter 8 is "00". The four kinds of the output signals from the code converter 8 directly relate to the levels of the picture signals, and in the case of the pattern analyzing system for the knitting machine according to the present invention, the aforesaid four kinds of the code converter output signals indirectly relate to the colors of the picture elements, because the picture signal levels are determined based on the picture element colors. The output from the code converter 8 is successively stored in a random access memory 10 through a buffer register 9. The memory 10 can be any digital memory which is accessible at random, and the illustrated embodiment uses an integrated circuit (IC) memory. To operate the memory 10, the address control 11 specifies the address therein. With the illustrated embodiment, the memory 10 comprises 2 stacks of 9,500 word IC memories, each word having 8 bits. Thus, sixteen bits can be simultaneously written in or read out at a time. Accordingly, the output signals from the code converter 8 (which has two bits per picture element) for eight picture elements are accumulated in the buffer register 9, and a sixteen bit group is stored in the memory as a unit.

Figures 2, 3:
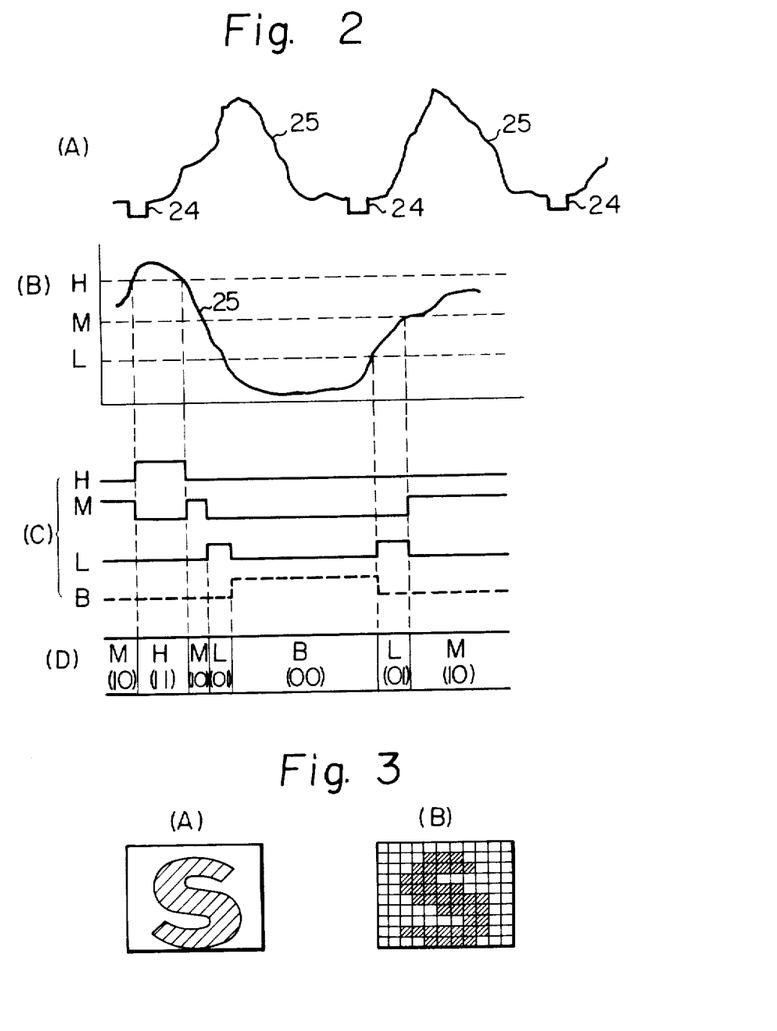
FIG. 2 is a schematic diagram showing the operation of a memory and its peripheral circuits.
FIG. 3 is a diagram showing a pattern grid.
Figure 4:
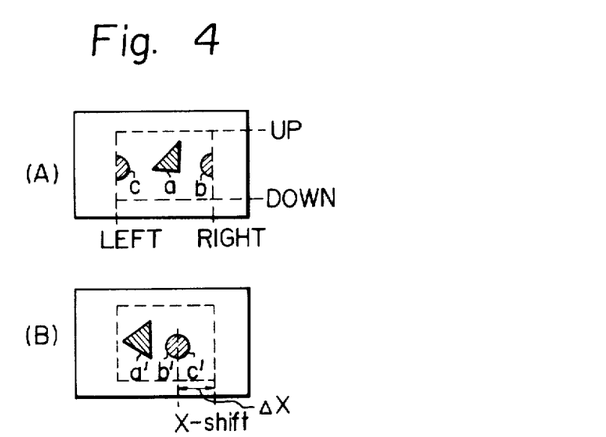
FIG. 4 is a schematic diagram showing mask action and shift action.

The memory 10 and its peripheral circuits will now be described by referring to FIG. 2. FIG. 2(A) shows a part of the output from the amplifier 6. As is apparent from the figure, the signal from the amplifier includes periodical horizontal synchronizing signals 24 and picture signals 25. Although vertical synchronizing signals are included in the output signal at longer intervals, they are not shown in the figure for simplicity. FIG. 2(B) shows an example of the picture signal to be applied to the comparators 7a, 7b and 7c. The comparators 7a, 7b and 7c, which have reference levels H, M and L, act to compare the input picture signal levels against the reference levels, so that the comparators 7a, 7b and 7c generate output pulses H, M and L, as shown in FIG. 2(C). The output from each comparator is applied to the input of the code converter 8, for coding said output. In the illustrated example, the output from the code converter assumes the values, as shown in FIG. 2(D): namely, a value "11" for the output H from the comparator, "10" for the output M from the comparator, "01" for the output L from the comparator, and "00" for the complete lack (B) of the outputs H, M and L. The information of FIG. 2(D) is successively stored in the memory 10, so that a pattern is stored in the memory; for instance, the pattern of an objective being analyzed, as shown in FIG. 3(A), is stored in the form of a digital pattern, as shown in FIG. 3(B). For simplicity, FIG. 3(B) shows the memory 10 as a cell grid of 10 rows and 11 columns, but the memory 10 in actual installations may have a different cell construction. In the example of FIG. 3(A), if the background is white (with a luminance of H level) and the S-shaped pattern is red (with a luminance of L level), the shaded cells in FIG. 3(B) store "01" signals, while the non-shaded cells store "11" signals.

Information processing and monitoring to be performed in the memory 10 will now be described by referring to FIG. 1.

A clock adjust 15 facilitates the adjustment of the period at which the output from the code converter is sampled. With the clock adjust 15, reference clock velocity (or sampling period) can be adjusted within a limited range, so that the pattern stored in the memory can be expanded (or reduced) in response to the limited adjustment of the clock speed, whereby electric adjustment for different positioning of the objective 1 relative to the camera 3 can be achieved.

Instead of writing only the pattern of the objective 1 being analyzed, it is possible to write other information in the memory 10 for processing therein. Such writing and processing of information are effected by a program-controlled computer, which is connected to a tape recorder 16 or a computer interface 17 communicating with the memory 10 through the buffer register 9.

After being suitably processed, the pattern stored in the memory 10 is ready for read-out into a proper output medium so as to become the input to a knitting machine. A suitable example of the output medium is a paper tape to be punched by a puncher 18. Since different knitting machines require different input forms of the pattern information, it is necessary to convert the information on the punched tape into the form suitable for a particular machine or to provide a suitable device, which is directly connected to the buffer register 9, for producing the memory output in a form suitable for the machine. If a knitting machine requires the pattern information in the form of punched tape, the embodiment of FIG. 1 can be used directly.

A switch 19 can select either the output pattern of the code converter 8 or the pattern stored in the memory 10, for display and monitoring at the monochromatic cathode ray tube 22 and the color cathode ray tube 23 through digital-analog converters 20 and 21, respectively. When the circuit of the contact a of the switch 19 is completed, the output from the code converter 8 is displayed at the cathode ray tubes 22 and 23, for showing a source image as scanned by the camera 3. On the other hand, when the switch 19 is turned to its contact b, the cathode ray tubes 22 and 23 display a pattern which is stored and processed in the memory 10. For color display at the color cathode ray tube (such as a shadow mask type tube), color matrix and other related control means are necessary, but such control means are essentially identical with those used in the conventional color television techniques. Accordingly, such control means are not explained herein.

A mask control 12 specifies an effective area which is to be displayed at the cathode ray tubes for pattern recompressed later to the unrecorded state, b, under the RF-field (the oriented particles in the adhesive still make electrical contact when broken bonds are brought back together, and the RF-field can then re-melt the adhesive and mend it). The magnetic field is so low that it hardly has an effect on the resonance of type $nf$ shells as in d (less than 200 gauss, say).

g. Type $aI$ micromechanisms have both temporary and permanent erasure capability, while type $nf$ can only be permanently erased by step a. Type $aI$ are temporarily erased by reducing external pressure to a fraction of an atmosphere, causing them all to expand to their spherical forms (FIG. 3 part d). However, without magnetic field, the bonds have been weakenned, so that recompression will tack, but the higher RF-field of e and f will re-expand those type $aI$ shells once expanded. Permanent erasure is by a.

The above mentioned information, as stored in micromechanisms, can be recalled in the form of an intrinsic acoustic impedance of medium I (absorptivity, amplification capacity and velocity of propagation, or otherwise known, refractivity) for the purpose of processing the ultrasonic waves to be described later, and this impedance is available, either immediately after recording, or after temporary erasure and recall as in step f. Micromechanisms impart impedance to I (or the medium in which they are contained) depending on their state through a liquid vehicle for the micromechanism mixture composing the medium. The acoustic impedance of this liquid vehicle is chosen to match that of compressed type $aI$ micromechanisms and that of compressed type $nf$, also. If type $aI$ shells are in the expanded state (d, FIG. 3) then they will impart an absorptivity to the medium in proportion to their number expanded per unit volume, because they have a much higher density when compressed than when expanded, and thus will scatter ultrasound when expanded due to the difference between their refractivity and that of the liquid. Type $nf$ have bulk modulus of elasticity equal to that of the liquid, when compressed, causing no alteration of velocity; whereas expanded, their modulus is much higher in the presence of the lower magnetic field (as f) causing a decrease in velocity of ultrasound in their vicinity proportional to the number per unit volume expanded. Approximate proportionality is typically maintained over a dynamic range of up to about 100 W/cm$^2$ or until about 1/10-th of the population is expanded. Since the number so expanded is inversely proportional to frequency-increase as in d, the medium will have a velocity of propagation at each point proportional to this recorded frequency-increase divided by recording amplitude.

It should be understood that operating sound intensity levels and operating field strengths must be adjusted to a given batch. With the strengths of activating fields so adjusted and in the recompressed, reactivated state, as above, the micromechanisms originally expanding with the recording process have a greater tendency to expand in proportion to the intensity of a subsequent ultrasonic wave than those unexpanded with recording, probably because the re-established adhesive bonds are weaker than the originally prepared bonds. For the RF-field of f, amplification per unit travel-time which the subsequent wave has will depend proportionally on the intensity of the recorded wave at each of the points of the medium. The explanation has already been given under step c as to how amplification takes place in an unrecorded population of type $aI$ micromechanisms.

Here, with the recorded intensity information and in the recompressed, reactivated state, that is, with the information recalled, the probability of expansion will be proportional to the product of the stimulating wave over-pressure and the recorded intensity. In other words, the recorded intensity can be in proportion to amplification capacity, as in copending application U.S. Ser. No. 473,812.

Image medium I (FIG. 1) thus consists of a 1:1-mixture of micromechanisms of types $aI$ and $nf$ in a liquid vehicle matching the impedances of compressed type $aI$ and compressed type $nf$, so that, an unrecorded image medium has an absorptivity greater than the maximum expected absorptivity in the object to be imaged, thus will be within range of the instrument. Very large compressed absorptivities for type $aI$ can be obtained by making thin shells and using high pressures of preparation and recompression, as well as by making their compressed diameter near a quarter-wave length of the ultrasound used in imaging. Smaller diameters have less scattering power, but greater resolution.

Medium R (FIG. 1) consists entirely of micromechanisms of type $aI$ in a liquid vehicle, to be described subsequently. In particular, R is able to reverse the direction of propagation of any pulse or ultrasonic wave that happens to be passing through the medium at the exact instant it is "activated" by an externally applied field, in this case, an RF-field of sufficiently high intensity that the adhesive in type $aI$ micromechanisms with its magnetic particles aligned as in preparation step a has a temperature just below its melting point, maintained by the heating of the RF-field, as in activation step b. The slight over-pressure of the wave-crests will then trigger the expansion of type AI shells suddenly and in phase with itself, with the resulting production of a larger amplitude wave of the same wave front geometry travelling in the reverse direction. It should be pointed out that both a forward and a reverse or "conjugate" wave are generated thereby from the incoming wave, due to the equidirectional expansion of the type $aI$ shells, but that the forward wave, travelling in the same direction as the incoming wave, is absorbed in damping media (D as in FIG. 1) and thus removed from interfering with the processing of the reverse wave. Such damping media are standard in ultrasonic technology.

In an embodiment employing 1.5 MHz ultrasound, the following parameters were found optimal, but mentioned here only by way of example and as a guide to the implementor, not as restrictions to the application: Micromechanisms of both types had a diameter of 80 microns, with 4 microns SaCo magnetic particles in their parafilm adhesive. Their shells had a thickness of 3-4 microns in case of type $aI$ and 4-8 microns in case of type $nf$. The liquid vehicle employed for both media I and R was propylene glycol, with density adjusted to acoustic transparency of the media by the addition of small amounts of uncured latex particles, also used in the shells of the micromechanisms, of diameter 1-3 microns. However, a wide variety of other relatively inert chemicals proved satisfactory with more or less filler. For example, mineral oil was adjusted with glass "Microballoons" (a product of Emerson & Cumming, Inc.) of diameter 2-4 microns. The RF- or microwave heating apparatus consisted of a magnetron, switched between waveguides leading to media I and R by means of a T-R switch, and operating at 3kMHz. The T-R switch was controlled at the necessary tenths of microold level of the comparators 7b, 7c and the ground level, respectively.

Figure 5:
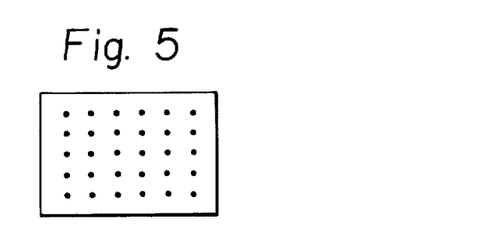
FIG. 5 shows a dot pattern for amendment.
Figure 6:
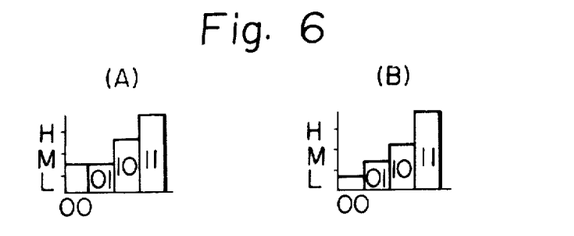
FIG. 6 is a diagram illustrating filter action.
Figure 7:
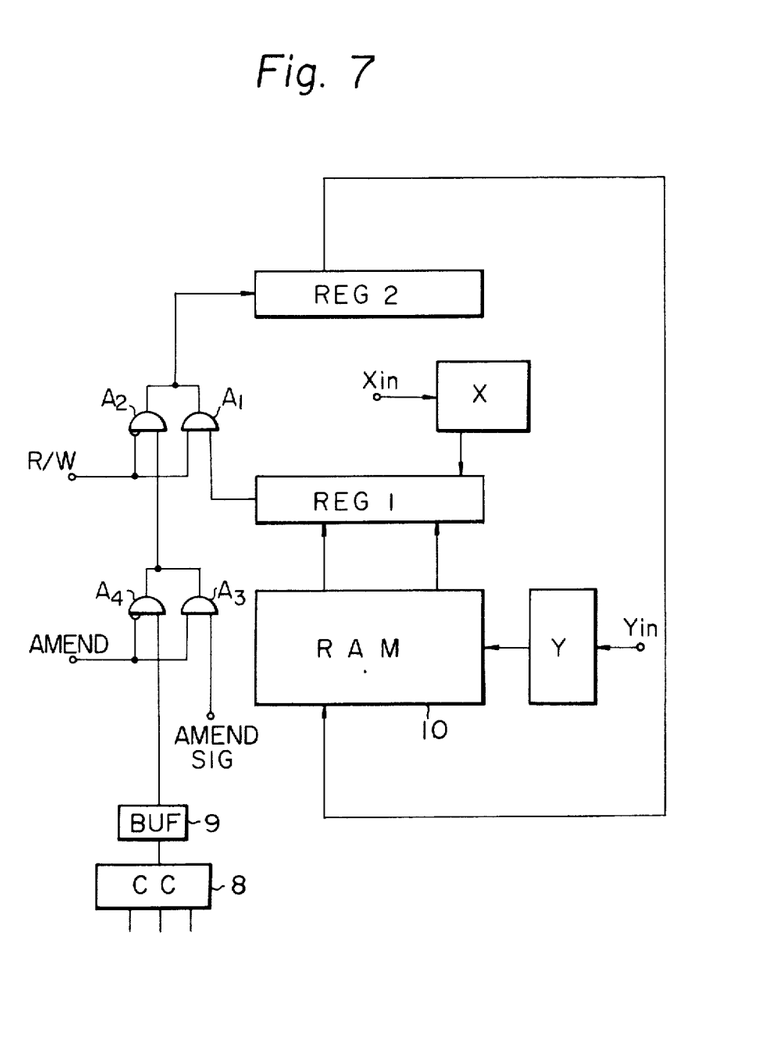
FIG. 7 is a circuit diagram of the unit for amendment operation in the pattern analyzing system of FIG. 1.
Figure 8:
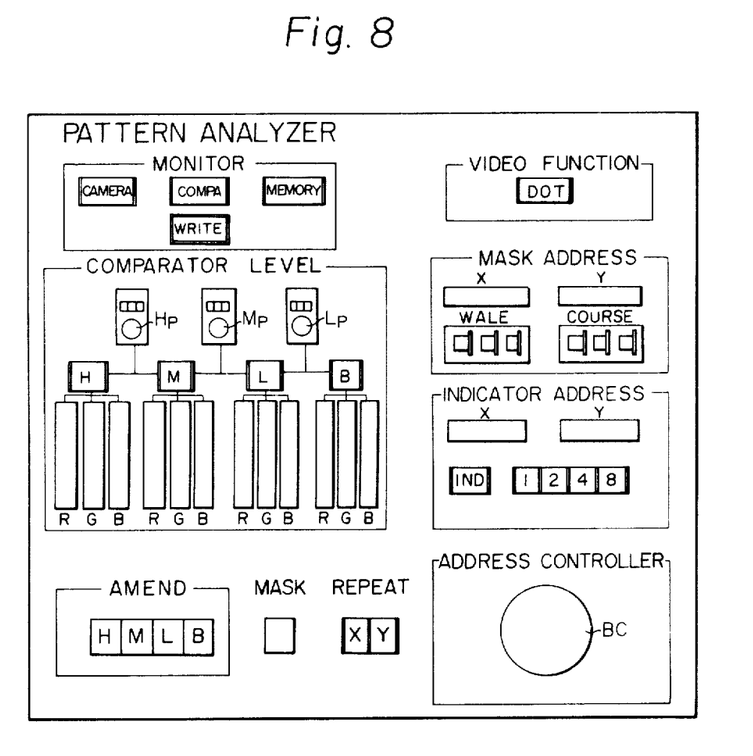
FIG. 8 is an arrangement of the operation board of the pattern analyzing system of FIG. 2.

The switch "DOT" in the frame "VIDEO FUNCTION" controls the dot pattern of FIG. 5. When the switch "DOT" is pushed, the pattern of FIG. 5 appears on the screen and when the switch "DOT" is repushed the same disappears.

The switch "MASK" controls the mask operation. When the switch "MASK" is pushed, the mask appears on the screen, and the size of that mask on the screen can be adjusted by the switches "WALE", and "COURSE" in the frame "MASK ADDRESS". The three figures of switches "WALE" and "COURSE" determine the longitudinal length and the width of the mask, respectively. The counters X and Y in the frame "MASK ADDRESS" display the coordinates of the mask on the screen.

The frames "INDICATOR ADDRESS" and "ADDRESS CONTROLLER" control the indicator on the screen. The indicator is a small bright spot on the screen for indicating an arbitrary point of the pattern. The indicator appears on the screen when the switch "IND" is pushed. The shape of the indicator is square, and the size of the same is adjusted by four figures of switches "1", "2", "4" and "8". The X and Y coordinates of the indicator on the screen are displayed on the counters "X" and "Y", respectively, and said coordinates can be adjusted by adjusting a ball controller BC.

The four switches H, M, L and B in the frame "AMEND" perform the amend operation. When one of the switches H, M, L, B is pushed, the color of the position indicated by the indicator is changed to the color relating to the H, M, L or B level.

The repeat switches "X" and "Y" control the repeat operation. The switch X performs the repeat of X-direction and the switch Y performs the repeat of Y-direction.

Now, the second embodiment of the present invention will be described with reference to FIGS. 9 through 13.

Figure 9:
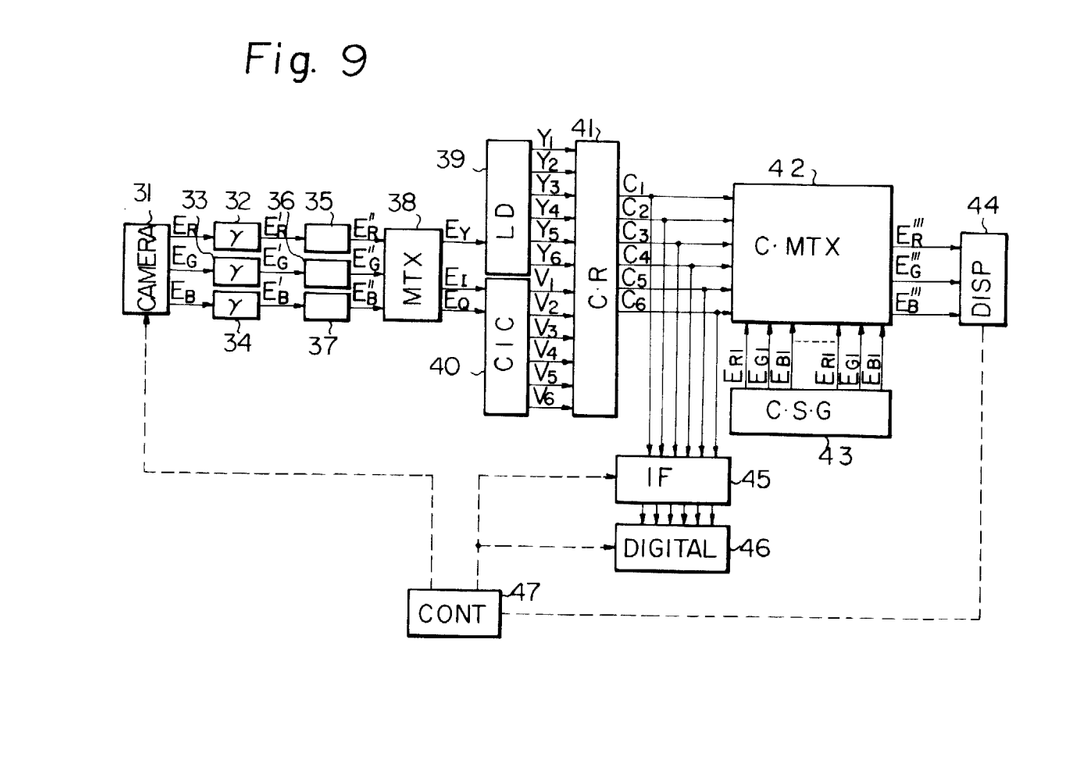
FIG. 9 is a block diagram of the second embodiment of the pattern analyzing system according to the present invention.

In FIG. 9, an electronic scanning device, e.g., a color television camera, scans an article or objective with a pattern to be analyzed, such as a picture design, a drawing, a sample cloth, or a model. More particularly, a electron beam scans an image formed on the screen of a camera tube of the device 31, so as to generate three analog primary color picture signals $E_R$, $E_G$, and $E_B$ in a sequential fashion, which signals represent the coloring of the objective.

The primary color picture signals from the aforesaid electronic scanning device are applied to $\gamma$ correction circuits 32, 33, and 34, respectively, for generating three corrected primary color picture signals $E_R'$, $E_G'$, and $E_B'$.

The corrected primary color picture signals $E_R'$, $E_G'$, and $E_B'$ are amplified by amplifiers 35, 36, and 37, and become signals $E_R''$, $E_G''$, and $E_B''$, which signals are operated by a matrix 38 in accordance with the following equation (1), so as to produce a luminance signal $E_Y$ and chrominance signals $E_I$ and $E_Q$ respectively.

$$\begin{bmatrix} E_Y \\ E_I \\ E_Q \end{bmatrix} = \begin{bmatrix} 0.3 & 0.59 & 0.11 \\ 0.6 & -0.28 & -0.32 \\ 0.21 & -0.52 & 0.31 \end{bmatrix} \cdot \begin{bmatrix} E_{R''} \\ E_{G''} \\ E_{B''} \end{bmatrix} \quad (1)$$

Of the signals from the matrix 38, the luminance signal $E_Y$ is applied to a luminance level divider 39, and divided into a plurality of luminance levels with a predetermined level width, so as to become one of the divided luminance signals $Y_1, Y_2, \ldots Y_6$.

The chrominance signals $E_I$ and $E_Q$ are applied to a chrominance vector divider 40, and divided into one of a plurality of arbitrarily divided chrominance levels, so as to become one of the divided chrominance vector signals $V_1, V_2, \ldots V_6$, respectively.

One or both of the divided luminance signal and the divided chrominance vector signal are applied to a color identifying circuit 41.

The color identification at the circuit 41 is carried out on the basis of the divided luminance signal alone, or divided chrominance vector signal alone, or combination of the two kinds of signals, so that one of the color specifying signals $C_1, C_2, \ldots C_6$ is produced.

A color signal generator 43 generates three controllable primary color image signals out of six colors, which signals are so controlled in a color specifying matrix circuit 42, based on the aforesaid color specifying signals, that three primary color picture signals $E_R'''$, $E_G'''$, and $E_B'''$, corresponding to the aforesaid color specifying signals, are generated and displayed on a color display means 44, such as a color cathode ray tube.

The aforesaid color specifying signals are applied to a digitizing means 46 through an interface 45, for producing pattern signal. A control circuit 47 performs supervision and control of the electronic scanning device, the color display means and the interface.

Each portion of the aforesaid system according to the present invention will now be described.

The electronic scanning device 31 is, for instance, a color television camera, and includes a lens system and a camera tube, such as a vidicon or an image orthicon. The device 31 produces, on its screen an image of the objective with a pattern to be analyzed (e.g., a picture design, a drawing, a sample cloth, a model), so as to generate sequential analog picture signals $E_R$, $E_G$, and $E_B$, representing three primary colors, red, green, and blue, respectively.

The three picture signals of primary colors are corrected by the $\gamma$ correction circuit 32, 33, and 34, to become corrected signals $E_R'$, $E_G'$, and $E_B'$, which are amplified by the amplifiers 35, 36, and 37 so as to become the signals $E_R''$, $E_G''$, and $E_B''$. The amplified signals are applied to the matrix circuit 38 for producing the following luminance signal $E_Y$ and chrominance signals $E_I$ and $E_Q$ by the aforesaid equation.

$$E_Y = 0.3E_R'' + 0.59E_G'' + 0.11E_B''$$

$$E_I = 0.6E_R'' - 0.28E_G'' - 0.32E_B''$$

$$E_Q = 0.21E_R'' - 0.52E_G'' + 0.31E_B''$$

Figure 10:
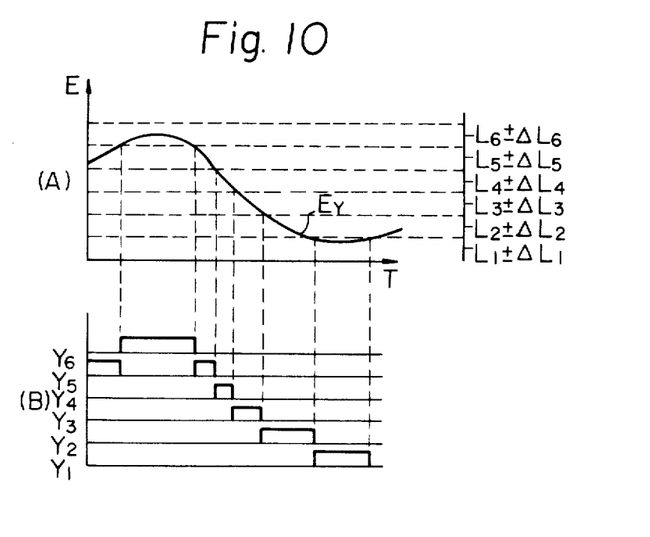
FIG. 10 is a schematic diagram showing the operation of a luminance level divider.

FIG. 10 shows the relation between the input waveform (A) of the luminance level divider 39 and output waveform (B) thereof. The luminance level divider has six preset levels ($L_1, L_2, L_3, L_4, L_5,$ and $L_6$) and preset level widths ($\Delta L_1, \Delta L_2, \Delta L_3, \Delta L_4, \Delta L_5,$ and $\Delta L_6$) for the different luminance levels, so that one of the divided luminance levels $Y_1, Y_2, Y_3, Y_4, Y_5,$ and $Y_6$ is generated, depending on the level of the sequential luminance signal $E_Y$. The levels ($L_1$ through $L_6$) and the level widths ($\Delta L_1$ through $\Delta L_6$) can be arbitrarily selected, and the divided luminance signals $Y_1$ through $Y_6$ are pulse signals whose pulse widths are modulated. Those skilled in the art can easily design a luminance level divider fulfilling the aforesaid functions, for instance, by combining a plurality of Schmidt circuits and gate circuits. Thus, the input luminance signals are quantitized.

Figure 11:
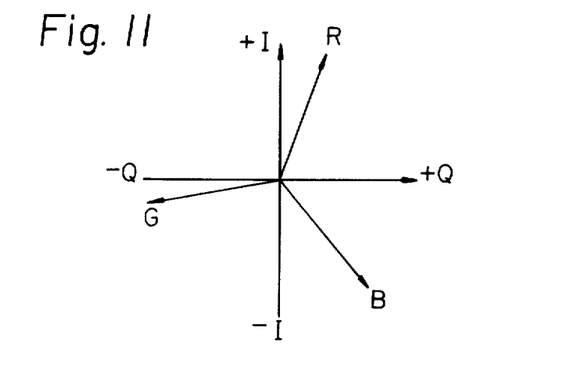
FIG. 11 is chrominance diagram (I-Q graph)

FIG. 11 is an I-Q graph showing the operation of the chrominance vector divider 40. The divider 40 determines the instantaneous coordinates of the input signals $E_I$ and $E_Q$ on the I-Q graph of FIG. 11, so as to identify one of a plurality of colors (e.g., six colors), depending on the angular deviation from a reference axis (e.g., +Q axis). In other words, the central values of reference angular deviations and allowable widths thereof are predetermined, so that one of the divided chrominance vector signal $V_1$ through $V_6$ can be instantly produced as the output signal, depending on the input chrominance signals $E_I$ and $E_Q$. The divided chrominance vector signals are also pulse signals whose pulse widths are modulated, as in the case of FIG. 10. It is preferable to make both the central values of the angular deviations and the angular widths variable from the outside by a suitable electric means. Thus, the chrominance of the input signal is quantitized.

Figure 12:
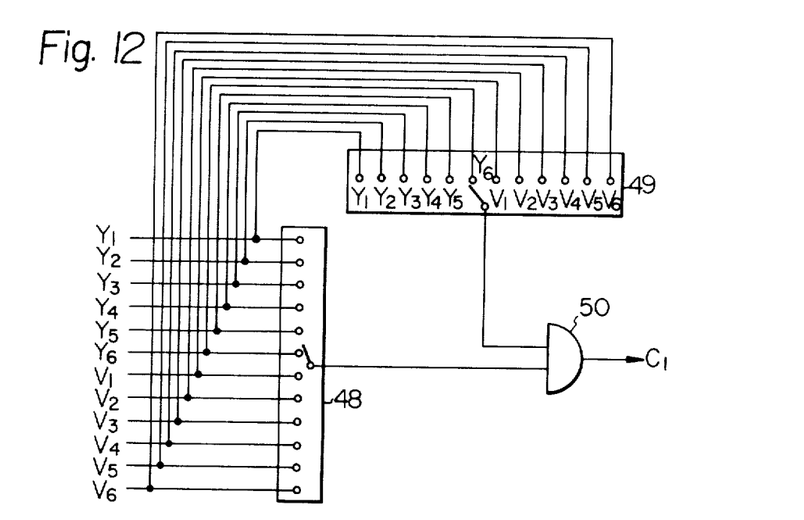
FIG. 12 is an example of the color identifying circuit 41 in the pattern analyzing system of FIG. 9.

FIG. 12 illustrates the essential portion of the color identifying circuit 41. The color identifying circuit 41 has switches 48, 49, and an AND gate circuit 50 for each of the color specifying signals $C_1$ through $C_6$, but only those for the color specifying signal $C_1$ are shown in the drawing, for simplicity. The circuit construction for other color specifying signals $C_2$ through $C_6$ are identical with that shown in FIG. 12. In FIG. 12, the switches 48 and 49 act to select one of the divided luminance signals $Y_1$ through $Y_6$ and one of the divided chrominance signal $V_1$ through $V_6$, respectively. The two output signals from the switches 48 and 49 are applied to the input of the AND circuit 50, and a color specifying signal $C_1$ appears at the output of the AND gate 50. The switches 48 and 49 are disposed at suitable positions for operation of the pattern analyzing section according to the present invention. For instance, if the contacts of the switches 48 and 49 are connected to $Y_1$, the color specifying signals $C_1$ satisfies the condition of $C_1 = Y_1$. On the other hand, if the contacts of the switches 48 and 49 are connected to $V_1$, the color specifying signal $C_1$ satisfies the condition of $C_1 = V_1$. Furthermore, if the contacts of the switch 49 are connected to $V_1$, while connecting the contacts of the switch 48 to $Y_1$, the color specifying signal $C_1$ is produced when the luminance is $Y_1$ and the chrominance is $V_1$. Thus, by using suitable combinations of the contacts of the switches 48 and 49, the color specifying signals can be related to the luminance and chrominance of each picture element of the source picture (pattern to be analyzed) in a suitable fashion.

Figure 13:
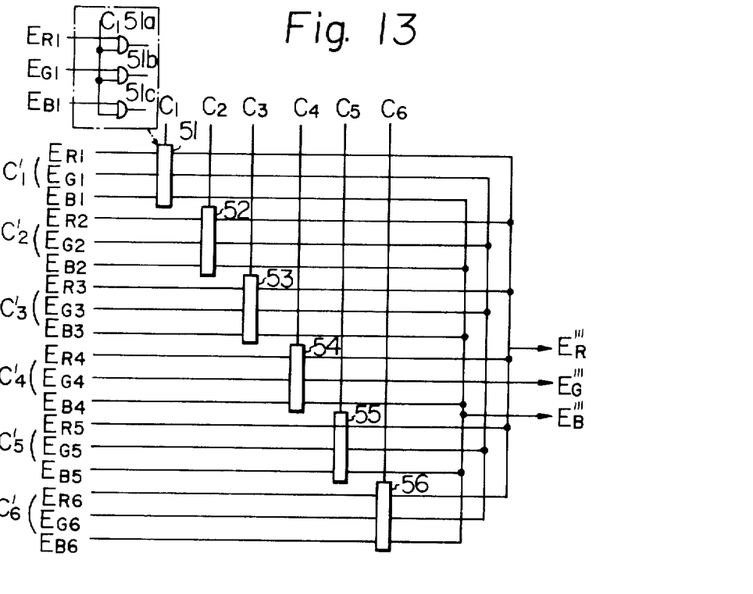
FIG. 13 is an example of a color specifying matrix circuit 42 in the pattern analyzing system of FIG. 9.

FIG. 13 shows a detailed circuit diagram of the color specifying matrix 42. The color specifying matrix circuit 42 has six logic circuits 51 through 56, and each logic circuit has three AND circuits. In FIG. 13, for the sake of simplicity only AND circuits 51a, 51b, and 51c of logic circuit 51 are illustrated. As mentioned above, the color signal generator 43 (FIG. 9) generates electric signals ($C_1'$ through $C_6'$) corresponding to a plurality of colors (six colors in the illustrated embodiment), and the three primary color picture signals [($E_{R1}$, $E_{G1}$, $W_{B1}$), . . . , ($E_{R6}$, $E_{G6}$, $E_{B6}$)] are applied to the color specifying matrix circuit 42, and such electric signals are gated by the color specifying signals $C_1$ through $C_6$. As is apparent from the foregoing explanation, since only one of the color specifying signals $C_1$ through $C_6$ is turned on at one time, the plurality of color signals $C_1'$ through $C_6'$ are gated by the color specifying signals $C_1$ through $C_6$, respectively, so as to successively provide the desired three primary color picture signals ($E_R'''$, $E_G'''$, $E_B'''$) for display at the color display means. Since the color signals $C_1'$ through $C_6'$ are electrically controllable, the color display means 44 (FIG. 9) can monitor not only the accurate reproduction of the source picture (pattern to be analyzed) but also a picture with picture elements having colors substituted for those of the source picture.

On the other hand, the color specifying signals $C_1$ through $C_6$ are applied to the digitizing means 46 through the interface 45, wherein the color specifying signals $C_1$ through $C_6$ are digitized for each picture element at suitable sampling intervals, for providing sequential digital signals. The digital signals are stored as the pattern signal, which is used for producing a Jacquard pattern by a knitting machine. A conventional digitizing circuit can be used for the aforesaid digitizing means, and the output from the digitizing means are stored in any of the known memories, such as punched paper tape or magnetic tape. The information thus stored in the digital form, of course, corresponds to the coloring of each picture element of the source picture.

As is apparent from the foregoing disclosure, with the system according to the present invention, a pattern signal for producing a Jacquard pattern by a knitting machine can be generated, while monitoring the analyzed pattern by a color display means and while allowing the adjustment of at least one of the level and level width for luminance division and the level and level width for the chrominance division, so that the desired pattern signal can be quickly and directly produced with a high accuracy. Thus, the system is simplified and its cost is reduced from the prior art.

It should be noted that the use of the signals $E_Y$, $E_I$, and $E_Q$ is not essential for producing the color identifying signals $C_1$ through $C_6$, and the output signals $E_R$, $E_G$, and $E_B$ from the television camera may be analyzed and synthesized in such a manner that the aforesaid signals $C_1$ through $C_6$ can be directly provided.

Outstanding effects which can be achieved by the pattern analyzing system according to the present invention are as follows.

(1) Conventional techniques for pattern analysis have a restriction that the objective pattern to be analyzed must be a design drawn on a section paper which can be wound around a rotary drum. The present invention eliminates such a restriction by using a television camera.

(2) The time necessary for the pattern analysis is very short, as compared with that of a conventional mechanical system.

(3) As compared with conventional techniques, the color identification can be effected faster with a higher accuracy.

(4) Repetition of a pattern can be electronically checked with ease.

(5) Erroneous color identification can be easily corrected by an amend mechanism.

(6) When the system of the invention is combined with a soft-ware controlled computer, it becomes possible to combine a plurality of patterns and to synthesize a large pattern.

From the foregoing it will now be apparent that a new and improved pattern generating system has been found. It should be understood, of course, that the embodiments disclosed are merely illustrative and are not intended to limit the scope of the invention. Reference should be made to the appended claims, therefore, rather than the specification as indicating the scope of the invention.

What is claimed is:

1. A pattern generating system for providing pattern information to produce a Jacquard pattern for a knitting or weaving machine comprising
   a television camera for converting the pattern of an objective being analyzed to analog signals, said television camera scanning individual lines and having a flyback time between lines,
   a plurality of comparators for dividing said analog signals into a plurality of partial signals in accordance with the amplitude of said analog signals,
   a code converter connected to said comparators for converting each of said partial signals into digital signals,
   digital memory means for storing said digital signals,
   output means for providing pattern information to the knitting or weaving machine in accordance with the digital signals stored by said digital memory means,
   said digital memory means including a buffer register and a memory unit, said buffer register being connected to said code converter for storing in said buffer register digital signals corresponding to one scanned line as each line is being scanned by said television camera, and means for transferring said one scanned line digital signals from said buffer register to said memory unit during a flyback time.

2. The pattern generating system as set forth in claim 1 wherein said memory unit is a random access integrated circuit memory unit and said buffer register and said memory unit are coupled in series circuit whereby said digital signals are stored in said memory unit synchronously with the line scanning of said television camera.

3. The pattern generating system as set forth in claim 2 wherein said television camera is a monochromatic television camera.

4. The pattern generating system as set forth in claim 2 wherein said television camera is a color television camera.

5. The pattern generating system as set forth in claim 3 wherein said system further includes processing means for changing the content of said memory unit.

6. The pattern generating system as set forth in claim 3 wherein said system further includes cathode ray tube means for monitoring the output of said television camera, the output of said code converter and the content of said memory unit.

7. The pattern generating system as set forth in claim 5 wherein said processing means for changing said content of said memory unit comprises means for performing amend control, means for performing shift control and means for performing mask control.

8. The pattern generating system as set forth in claim 2 wherein said digital signals comprise one of the color specifying signals from said color television camera.

9. The pattern generating system as set forth in claim 8 wherein said system further includes a display for monitoring simulated color signals, said display receiving said color signals from a color specifying matrix, said color specifying matrix receiving said color specifying signals and three primary color picture signals supplied from a color signal generator.

10. The pattern generating system as set forth in claim 4 wherein said system further includes a color filter located between said television camera and said objective.

* * * * *

UNITED STATES PATENT OFFICE
CERTIFICATE OF CORRECTION

PATENT NO. : 4,078,253

DATED : March 7, 1978

INVENTOR(S) : T. Kajiura et al

It is certified that error appears in the above-identified patent and that said Letters Patent are hereby corrected as shown below:

On the Title page, item [30], after "Mar. 4, 1974 Japan ... 24140/74" insert --Mar. 4, 1974 Japan ... 24141/74--.

Signed and Sealed this

Twenty-sixth Day of September 1978

[SEAL]

Attest:

RUTH C. MASON
Attesting Officer

DONALD W. BANNER
Commissioner of Patents and Trademarks